W. J. DAVIS.
SPRING WHEEL.
APPLICATION FILED APR. 5, 1917.
1,240,951.
Patented Sept. 25, 1917.
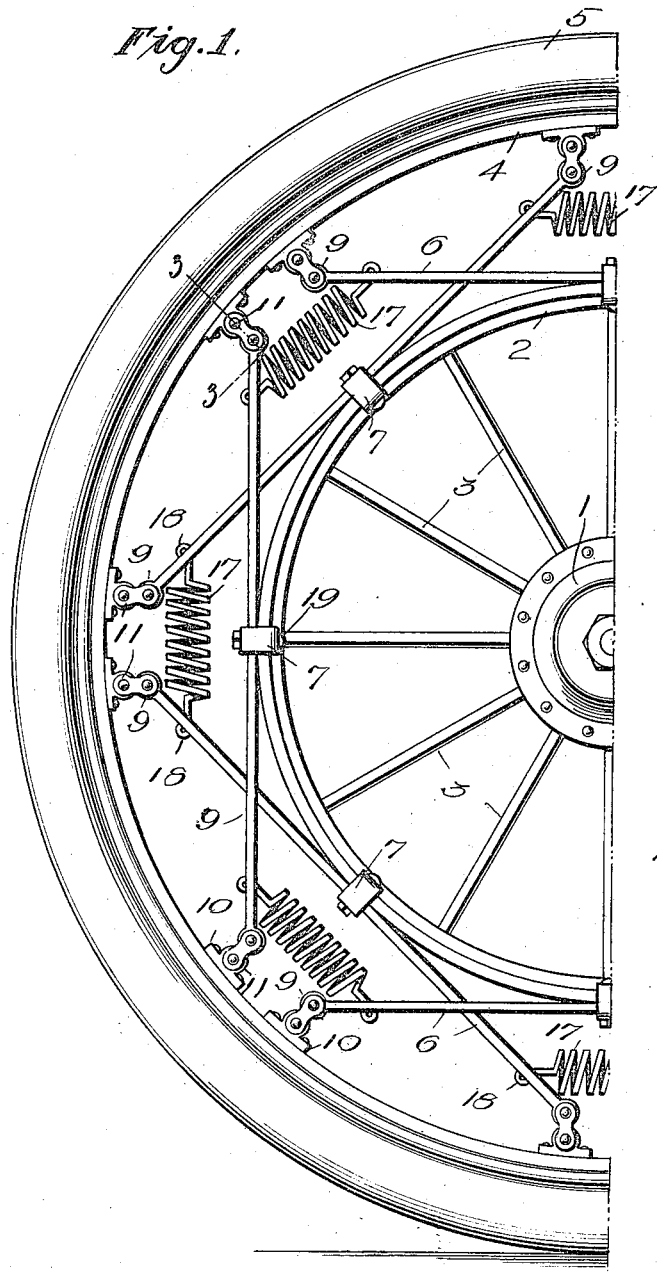
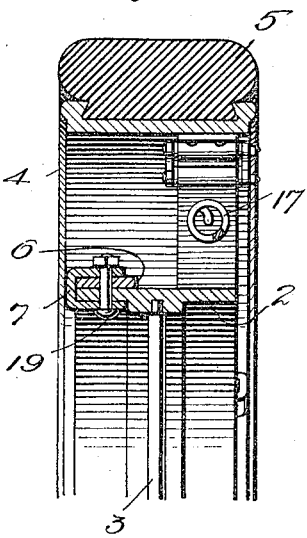
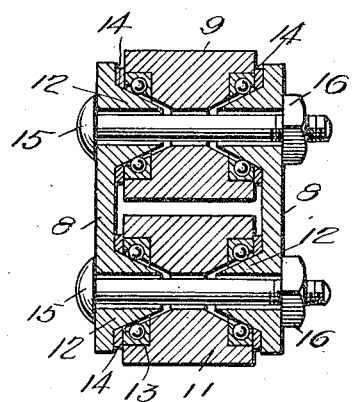
WITNESSES
W. C. Fielding.
W. E. Beck.
INVENTOR
William J. Davis
BY
ATTORNEYS

UNITED STATES PATENT OFFICE.

WILLIAM JOHN DAVIS, OF REDIG, SOUTH DAKOTA.

SPRING-WHEEL.

1,240,951.    Specification of Letters Patent.    Patented Sept. 25, 1917.

Application filed April 5, 1917. Serial No. 159,951.

*To all whom it may concern:*

Be it known that I, WILLIAM JOHN DAVIS, a citizen of the United States, and a resident of Redig, in the county of Harding and State of South Dakota, have invented an Improvement in Spring-Wheels, of which the following is a specification.

My invention is an improvement in spring wheels, and the invention has for its object to provide a wheel of the character specified, especially adapted for heavy motor vehicles, wherein resilient mechanism is arranged between the rim and the hub for cushioning the hub against the rim.

In the drawings:

Figure 1 is a side view of a portion of the improved wheel.

Fig. 2 is a partial radial section of the wheel.

Fig. 3 is an enlarged section on the line 3—3 of Fig. 1.

In the present embodiment of the invention an inner wheel is provided consisting of a hub 1, a rim 2 and spokes 3 connecting the hub and the rim, and an outer auxiliary rim 4 is arranged concentric with the wheel. This rim 4 may carry a solid tire 5, as shown, and the said rim is connected to the rim 2 of the inner wheel by a series of straight plate springs 6, one series being arranged at one face of the wheel, and the other series at the other face.

The springs 6 are clamped by substantially U-shaped clips 7, more particularly shown in Fig. 2, the said clips engaging the rim 2 and engaging the spring 6 at the center of the spring. Thus the springs 6 are tangential to the inner wheel, and they are connected at each end to the auxiliary rim 4 by oppositely arranged pairs of straps 8. At each end each of the spring 6 is provided with an eye 9, and a bracket 10 provided with a similar eye 11 is secured to the rim 4 at each end of each spring 6. These eyes 9 and 11, as shown in Fig. 3, are counterbored or reamed at each end, and the straps 8 have conical extensions 12 which fit loosely within the recesses.

A ball race 13 is arranged within each of the recesses, the balls of the race engaging the tapering face of the adjacent extension. Washers 14 are arranged between the straps and the races, and bolts 15 are passed through the eyes and through registering openings in the straps, and are engaged by nuts 16 to hold the parts in proper position. Thus the springs 6 are connected to the outer rim by a ball bearing connection that permits a very free movement of the springs with respect to the rim.

It will be noticed from an inspection of Fig. 1 that four springs 6 are arranged at each face of the wheel, and that each spring is of approximately the same length as the diameter of the inner wheel. Hence each four springs form substantially a parallelogram, and the two parallelograms formed by the eight springs at each side have their diagonals at angles of 45° with respect to each other. The adjacent ends of the springs of each parallelogram are connected by coil springs 17 near their connection with the auxiliary rim, the ends of the said coil springs being passed through openings in the plate springs and bent to form a lock 18, as shown in Fig. 1. The coil springs assist in holding the parts in the position of Fig. 1 and with the straps 8 radial to the wheel.

In the normal position the springs 6 are neutral, that is neither under tension nor contraction, and they will exert a cushioning action in either direction.

The clips 7 are secured to the inner rim 2 by means of bolts 19 which are passed through registering openings in the arms of the clips, the rim and the spring. In practice the washers 14 are of felt or the like, and are soaked with oil to oil the bearings.

It will be understood that the improved wheel, while especially adapted for heavy cars, is also adapted for use on light cars, motorcycles, bicycles, buggies or the like. The ball bearings may be provided with oil by an opening through the end of the spring, the opening being normally closed by a screw plug.

I claim:

A spring wheel comprising an inner wheel, an outer rim concentric with the inner wheel, two sets of straight plate springs, each of said springs being disposed tangentially to the rim of the inner wheel and secured at a central point thereto, radially disposed straps connecting the extremities of the plate springs with the outer rim, one set of springs being disposed at one face of the wheel and the other set at the opposite face of the wheel, the centers of the springs of each set being opposite the ends of the springs of the other set shackled to the outer rim, and contractile helical springs connecting the terminal portions of adjacent plate spring and disposed between the shackled ends thereof and the rim of the inner wheel and parallel with the plate springs of the set opposite the shackled ends of the remaining set.

WILLIAM JOHN DAVIS.

Copies of this patent may be obtained for five cents each, by addressing the "Commissioner of Patents, Washington, D. C."